UNITED STATES PATENT OFFICE.

EUSTACE MARTIN TINGLE, OF LICHFIELD, ENGLAND.

SELF-RAISING FLOUR.

SPECIFICATION forming part of Letters Patent No. 595,980, dated December 21, 1897.

Application filed December 5, 1896. Serial No. 614,652. (No specimens.)

*To all whom it may concern:*

Be it known that I, EUSTACE MARTIN TINGLE, a subject of the Queen of Great Britain, residing at Lichfield, in the county of Stafford, England, have invented a certain new and useful Improved Self-Raising Flour, of which the following is a specification.

This invention relates to an improved self-raising flour for use in the making of breads, pastry, and confectionery, and has for its object a composition flour which will dispense with the use of eggs, egg powders, &c., and which at the same time will enable a housewife or other person to produce articles of a standard of excellence equal to those produced by a first-class confectioner.

My improved flour contains as an ingredient a material to take the place of eggs or egg powders, (which would have to be used in the case of ordinary flour,) the same being combined with a mixing and fermenting agent and in such a proportion as to give to the articles produced the appearance of having eggs contained therein.

The important ingredient of my self-raising flour is an anilin-dye composition known to the trade under the name of "egg color No. 1,183," and consists of the sodium salt of a mixture of the mono and di sulfonic acids of amidoazo-benzole. This egg color as sold to the trade is in lump form, but when combined and used in accordance with the provisions of my invention it is first pulverized or powdered.

As an illustration of my improved flour compound, I take eighty-four pounds of ordinary plain flour and mix therewith two pounds of cream of tartar, one pound of carbonate of soda, one and one-half pounds of rice-flour, two ounces of tartaric acid, and half an ounce of the hereinbefore-mentioned egg color.

The cream of tartar, carbonate of soda, and tartaric acid are first mixed together and strained through a hair sieve in the ordinary manner and then subsequently mixed with the rice-flour and egg color, these two latter elements having been previously prepared by pounding together in a mortar, the rice-flour acting as a mixing agent to the said egg color. These ingredients are then added to the eighty-four pounds of plain flour, the whole composition being mixed and forming a self-raising flour which when made up will give a result equal to the adding of eggs or egg powders.

An important feature of this particular coloring-matter is that it imparts no bitter or unpleasant taste to the articles with which it is used.

I do not limit myself to the precise quantities of ingredients herein given, as they may be varied in some particulars to suit the class of articles to be ultimately produced.

I am aware that it is not broadly new to use coloring agents—such as turmeric, saffron, and the like—in the manufacture of confectionery; but these coloring-matters require special preparation and making up and cannot be successfully used except by those persons fully acquainted with them, lest a bad effect is produced.

My invention is distinguished from the above in that I produce and place upon the market a compound self-raising flour furnished with the necessary quantity of egg coloring-matter and which can be used by the public generally without any prior experience whatever, and no bad effects are likely to occur.

What I claim, and desire to secure by Letters Patent, is—

1. An egg coloring composition composed of the sodium salt of a mixture of the mono and di sulfonic acids of amidoazo-benzole in powdered form, combined with rice-flour, substantially as and for the purpose set forth.

2. A self-raising compound composed of ordinary flour, carbonate of soda, tartaric acid, cream of tartar, and an egg coloring-matter composed of the sodium salt of a mixture of the mono and di sulfonic acids of amidoazo-benzole combined with rice-flour, substantially as and in about the proportions set forth.

In testimony whereof I have signed my name to this specification in the presence of two subscribing witnesses.

EUSTACE MARTIN TINGLE.

Witnesses:
GEO. AVERY,
A. F. BIDDLE.